(12) United States Patent
Gade et al.

(10) Patent No.: US 10,552,273 B2
(45) Date of Patent: *Feb. 4, 2020

(54) SYSTEMS AND METHODS FOR SUPPORT LOG CACHE DEVICE REMOVAL THROUGH STANDARD USER INTERFACES

(71) Applicant: Oracle International Corporation, Redwood Shores, CA (US)

(72) Inventors: Apoorva Vennavaram Gade, Riverside, CT (US); Juan Carlos Zuluaga, Somerville, MA (US)

(73) Assignee: Oracle International Corporation, Redwood Shores, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/985,176

(22) Filed: May 21, 2018

(65) Prior Publication Data

US 2018/0267873 A1 Sep. 20, 2018

Related U.S. Application Data

(63) Continuation of application No. 15/182,097, filed on Jun. 14, 2016, now Pat. No. 10,013,320.

(51) Int. Cl.
*G06F 11/20* (2006.01)
*G06F 11/14* (2006.01)
*G06F 12/0866* (2016.01)
*G06F 12/02* (2006.01)

(52) U.S. Cl.
CPC ...... *G06F 11/2058* (2013.01); *G06F 11/1435* (2013.01); *G06F 11/1464* (2013.01); *G06F 11/2069* (2013.01); *G06F 12/02* (2013.01); *G06F 12/0866* (2013.01); *G06F 2201/84* (2013.01); *G06F 2212/214* (2013.01); *G06F 2212/286* (2013.01)

(58) Field of Classification Search
CPC ............ G06F 11/1092; G06F 11/1435; G06F 11/2069; G06F 17/30067
See application file for complete search history.

(56) References Cited

U.S. PATENT DOCUMENTS

| 6,671,705 B1 | 12/2003 | Duprey et al. |
| 7,434,091 B1 | 10/2008 | Karr |
| 7,707,453 B2 | 4/2010 | Winokur |
| 2003/0237019 A1* | 12/2003 | Kleiman ............ G06F 11/1092 714/6.32 |

(Continued)

OTHER PUBLICATIONS

Ntmatter, "Unable to remove a mirrored ZIL," "LiveJournal", Nov. 23, 2011, Retrieved from https://ntmatter.livejournal.com/10276.html.

(Continued)

*Primary Examiner* — Jigar P Patel
(74) *Attorney, Agent, or Firm* — Kilpatrick Townsend & Stockton LLP

(57) ABSTRACT

Aspects of the present disclosure involve systems and methods for removes and/or adding log and/or cache devices to storage pools of a storage appliance. Users, via a graphical-user interface, identify the log and/or cache devices for removal or addition. Subsequently, the log and/or cache devices are moved, according to a data profile corresponding to the devices, from a first storage appliance to a second storage appliance.

20 Claims, 4 Drawing Sheets

(56) References Cited

U.S. PATENT DOCUMENTS

2015/0378415 A1* 12/2015 George ............... G06F 1/30
307/64

OTHER PUBLICATIONS

Lingeswaran R, "ZFS—ZPOOL Cache and Log Devices Administration", "UnixArena", Jul. 27, 2013. Retrieved from https://www.unixarena.com/2013/07/zfs-zpool-cache-and-log-devices.html.

* cited by examiner

SYSTEMS AND METHODS FOR SUPPORT LOG CACHE DEVICE REMOVAL THROUGH STANDARD USER INTERFACES

CROSS-REFERENCE TO RELATED APPLICATIONS

The present application is a continuation of U.S. Nonprovisional application Ser. No. 15/182,097, filed Jun. 14, 2016, which is hereby incorporated by reference in its entirety for all purposes.

TECHNICAL FIELD

Aspects of the present disclosure relate to storage appliances, and in particular, systems and methods for managing devices of storage appliances.

BACKGROUND

Storage pools provide data to, or manage data for, network-connected computing devices. Conventional storage pools do not provide mechanisms that provide flexibility for moving devices included within the storage pools, such as a cache and/or log devices, from a first storage pool to a second, different storage pool, resulting in sub-optimal use of the devices. Moreover, in the event that a cache and/or log device must be moved from a storage pool, conventional methods require manual intervention by service providers, which is time consuming, labor-intensive, and expensive.

It is with these concepts in mind, among others, that various aspects of the present disclosure were conceived.

SUMMARY

Aspects of the present disclosure include methods, systems, and computer-readable mediums for managing devices in a storage appliance comprising. The methods, systems, and computer readable mediums involve a plurality of physical storage devices logically arranged in a storage pool of a storage appliance, the storage appliance associated with at least one file system. The methods, systems, and computer readable mediums further involve an application, executing on a processing device, wherein the application communicates with the file system to remove devices from the plurality of devices from the storage pool by: receiving a request to remove at least one device of the plurality of devices; and based on the request, determining a type of the at least one device and identifying a data profile corresponding to the device. The methods, systems, and computer readable mediums further involve based on the type of the device and the identified data profile, removing the device from the storage pool of the storage appliance.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve a mechanism that automatically removes and/or adds devices to and from a storage pool of a storage appliance. Generally speaking, a storage appliance represents a large pool of storage aggregated from disparate physical storage resources logically maintained as one or more volumes in a shared storage environment. Functionally, storage appliances provide data to and/or manage data for network-connected computing devices. Common storage appliances include network attached storage ("NAS") and storage area network (SAN) devices.

In various aspects, one or more storage appliance user-interfaces, graphical-user interfaces, and/or the like may be generated that enable users to select various devices of the storage appliance for logical removal (e.g., from a storage pool). Additionally, the user-interfaces may be used to logically add the removed devices to other storage pools. For example, administrative users may interact with the storage appliance user-interfaces to logically move devices included in a storage pool of the storage appliance to other storage appliance pools when performing a cost/benefit analysis. As another example, providing users with the ability to add and/or remove devices through the storage appliance user-interfaces dynamically offers more flexibility to the user to move such devices between pools depending upon load circumstances of a given storage appliance. In yet another example, the appliance user-interfaces provide a non-disruptive way to add and/or remove devices prior to a storage appliance system upgrades.

In one specific example, the storage appliance(s) described in the present application may be an Oracle® ZFS storage appliance. The Oracle® ZFS storage appliance is a hybrid storage system based on a unique cache-centric architecture featuring massive DRAM push flash that is powered by a symmetric multithreading (SMP) storage operating system. The ZFS file system includes a mechanism for reducing write latency known as the ZFS Intent Log (ZIL). On the Oracle® ZFS storage appliance, the device used to hold the ZIL is a low-latency, high-endurance and write-optimized solid state drive ("SSD") referred to as a "log device". The Oracle® ZFS storage appliance also includes low-latency, high-endurance and read-optimized solid state drives ("SSD") referred to as a "cache devices". Both the log devices and/or cache devices may be added and/or removed from a ZFS pool using the storage appliance user-interfaces.

The present application uses the Oracle® ZFS storage appliance as an example to illustrate the inventive concepts setout herein. The present application, however, is not limited to the Oracle® ZFS storage appliance and may be applied to other type of storage appliances, storage pools, storage devices, and/or the like where write-optimized devices (e.g., log device) and/or read-optimized devices (e.g., cache device), and/or other devices are maintained in a storage appliance.

Figure 1A:
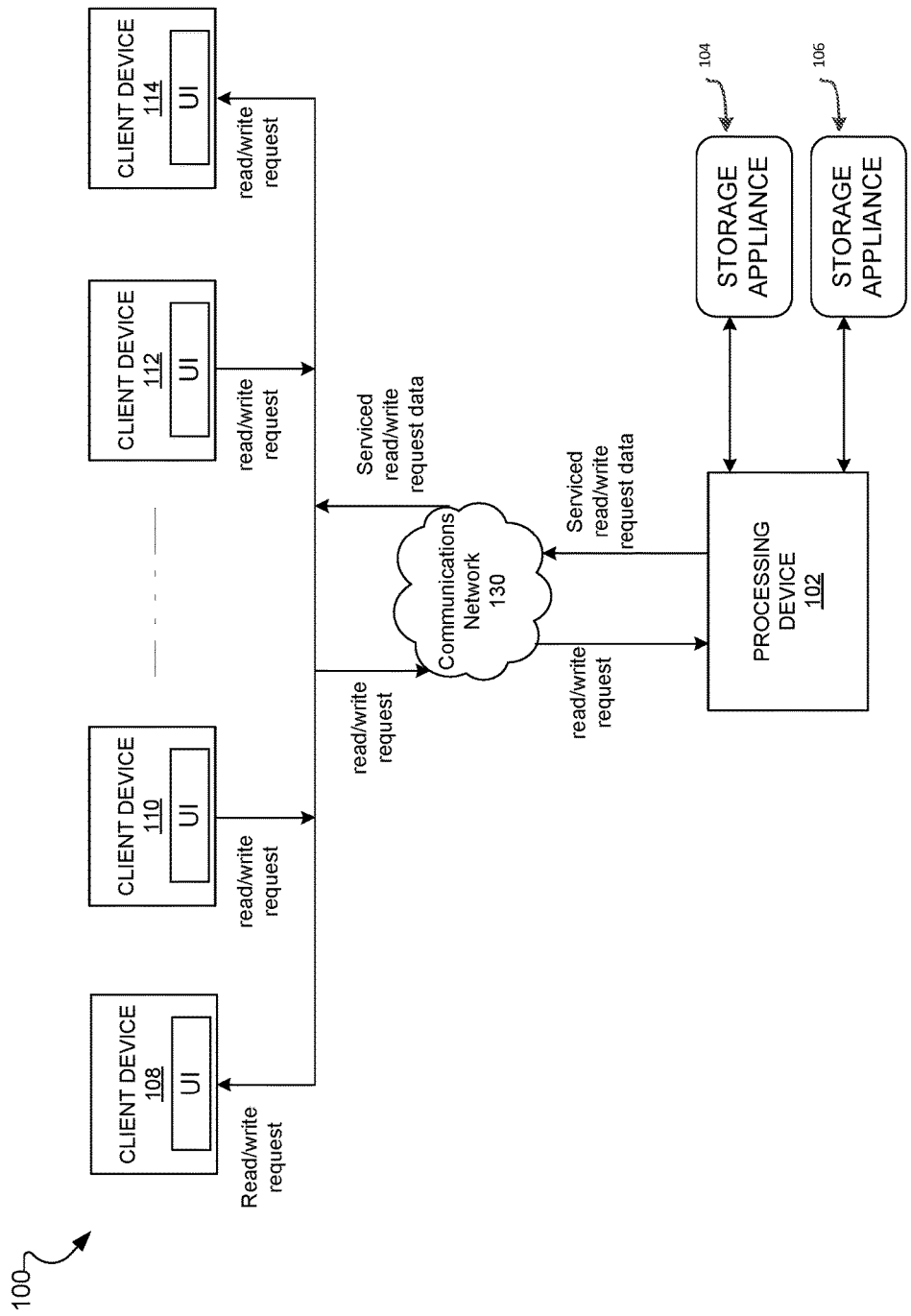
FIG. 1A is a block diagram illustrating a computing architecture for managing devices of storage appliances, according to aspects of the present disclosure.

FIG. 1A illustrates a computing architecture 100 capable of allowing users to add and/or remove devices (e.g., log and/or cache devices) from a storage pool of a storage appliance, according to one embodiment. As illustrated, the computing architecture 100 includes a processing device 102 (e.g., a server device) capable of managing requests to manipulate (e.g., add, remove) storage pool devices, such as log and cache device(s), currently maintained in one or more storage appliances 104 and 106. The requests may be received from one or more client devices 108-114 distributed throughout and/or otherwise accessible (i.e., networked) via a communications network 130 (e.g., a cloud computing arrangement), which may be an IP-based telecommunications network, the Internet, an intranet, a local area network, a wireless local network, a content distribution network, or any other type of communications network, as well as combinations of networks. The one or more client devices 108-114 may be any of, or any combination of, a personal computer; handheld computer; mobile phone; digital assistant; smart phone; server; application; and the like. In one embodiment, each of the one or more client devices 108-114 may include a storage appliance user-interface that interfaces with the storage appliances 104 and 106 and/or a processor-based platform that operates on any suitable operating system, such as Microsoft® Windows®, Linux®, and/or the like that is capable of executing software and issuing requests.

Figure 1B:
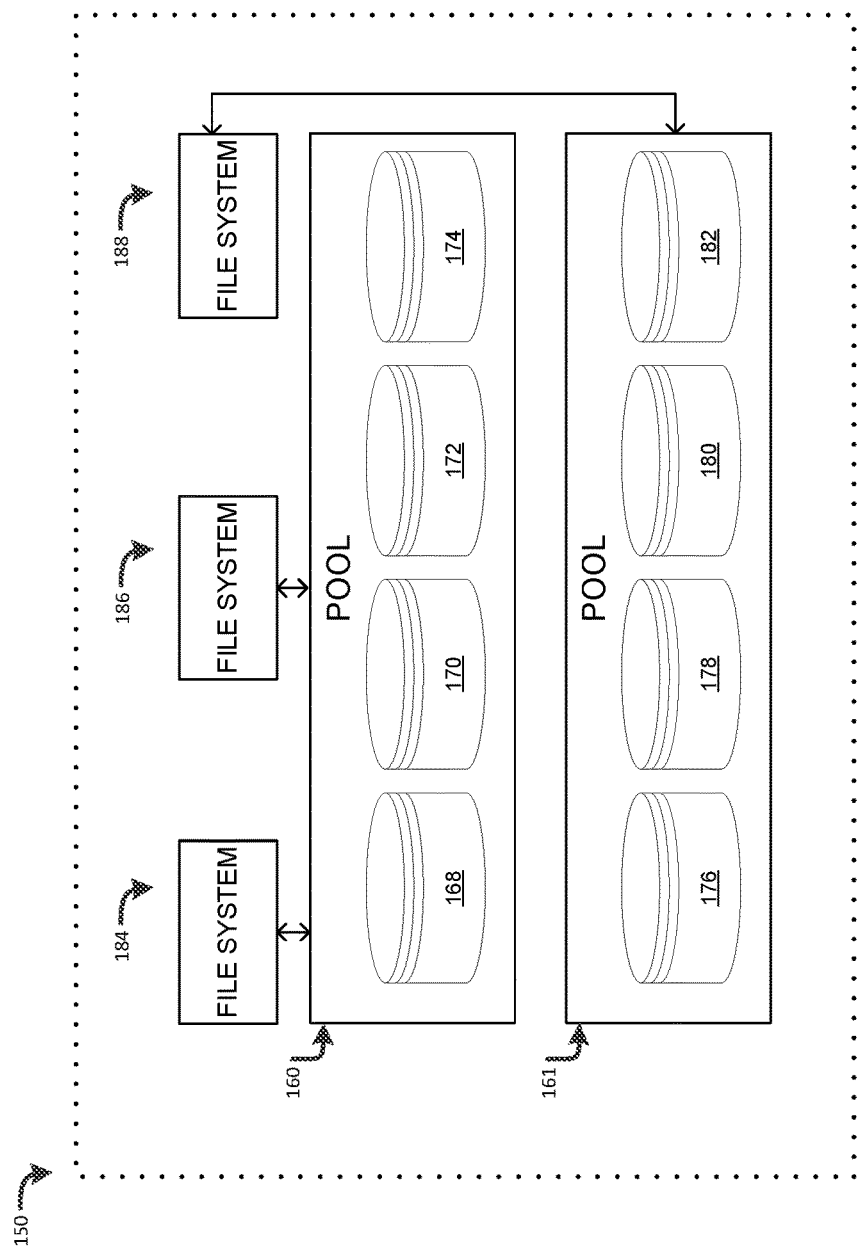
FIG. 1B is a block diagram illustrating a storage appliance, according to aspects of the present disclosure.

FIG. 1B provides an illustration of a storage appliance 150 (e.g., storage appliances 104 and 106) for which a user may generate requests to manipulate (e.g., add and/or remove) log and/or cache devices. As illustrated, the storage appliance 150 includes one or more extendable storage pools 160 and 161. Generally speaking, a storage pool 160 and 161 represents a logical arrangement of storage capacity aggregated from disparate storage resources. Accordingly, in the illustrated embodiment, storage pool 160 and 161 logically arranges a set of disks, including a variety of write-accelerating SSDs (log), read-accelerating SSDs (cache), and/or other physical disks 168-172 into a single storage capacity. File systems 184-188 are allocated out of the storage pool 160 and/or 161. The file systems 184-188 define the structure and logical rules for which data is stored, accessed, and manipulated within the disks, including the variety of write-accelerating SSDs (log), read-accelerating SSDs (cache), and/or other physical disks 168-172, of the storage pools 160 and/or 161. In one particular embodiment, the storage pools 160 and 161 may be logically organized according to a just of bunch of disks ("JBOD") architecture. JBOD generally refers to a collection of hard disks that are typically not configured as a redundant array of independent disks ("RAM").

In some embodiments, each disk of the set of disk 168-174 may be associated with a data storage profile configuration that reflects the performance goals of the disk or device. A "striped" profile indicates that data is striped across disks, with no redundancy. While a striped profile maximizes both performance and capacity, a single disk failure implemented according to a striped profile will result in data loss. A "mirrored" profile indicates that data is mirrored, reducing capacity by half, but yielding a highly reliable and high-performing system. A mirrored profile is recommended when space is considered ample, but performance is at a premium (for example, database storage).

Figure 2:
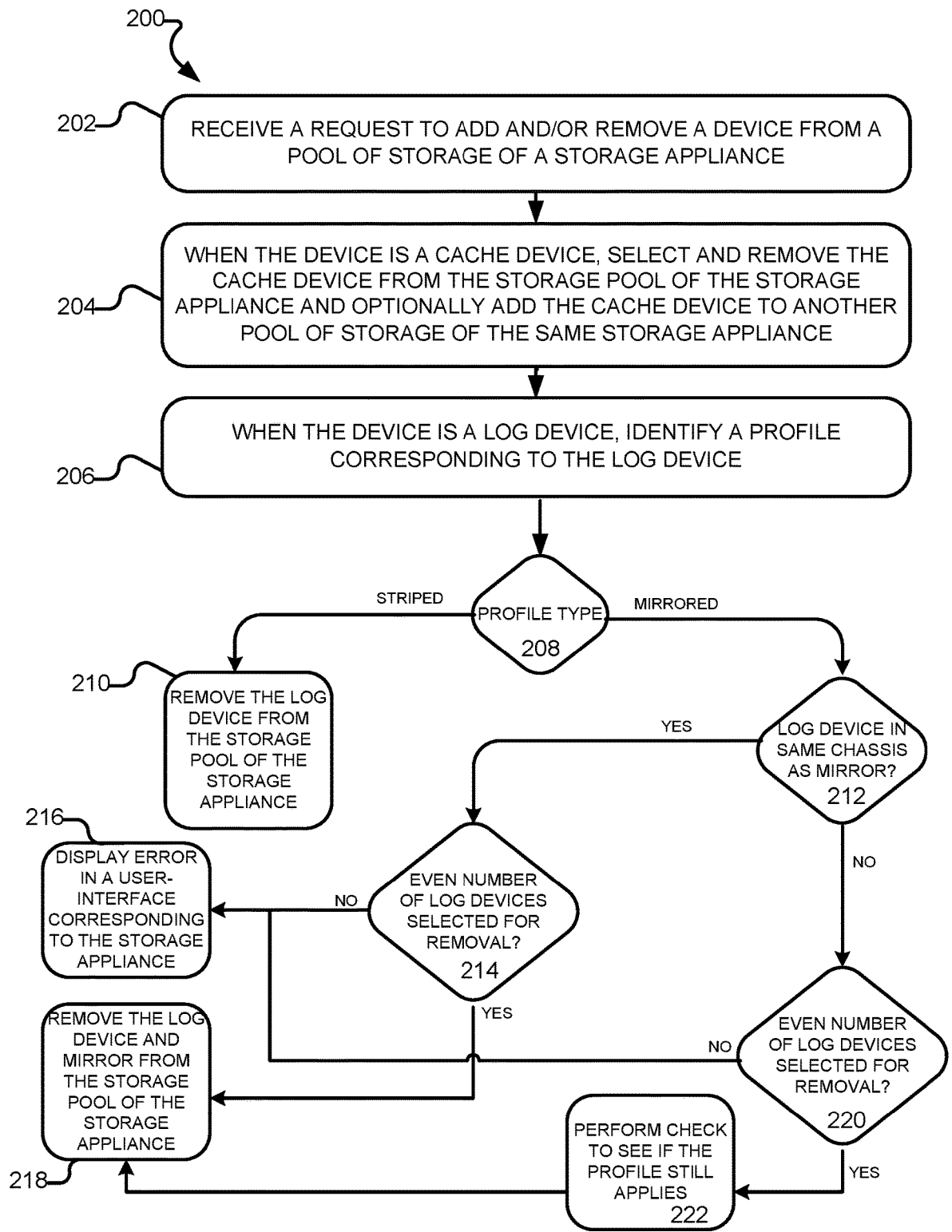
FIG. 2 is a flowchart illustrating an example process for adding and/or removing devices of a storage appliance, according to aspects of the present disclosure.

Referring now to FIG. 2 and with reference to FIG. 1A, an illustrative process 200 for allowing users to remove log and cache devices from a storage pool of a storage appliance is provided. As illustrated, process 200 begins with receiving a request to manipulate a log and/or cache device currently maintained in a pool of storage included in a storage appliance (operation 202). Referring again to FIG. 1A, the processing device 102 receives a request from the one or more client devices 108-114 for execution and service. The request includes instructions to add and/or remove a device from a storage pool of a storage appliance. For example, customers (i.e., users) often run into situations where devices are to be removed from a previously configured storage pool. One such case is during a system upgrade where cache disks are to be pulled out or removed prior to performing any upgrades. As another example, a user may want to remove a device from a first storage pool and subsequently add the device to a second (e.g., different) storage pool. To do so, the user interacts with the client devices 108-114 and provides a request. Based on the type of the device and any profile corresponding to the device being manipulated (e.g., added or removed), the processing device 102 automatically processes the request and thereby adds and/or removes the device from the storage pool of a storage appliance.

Referring again to FIG. 2, when the request indicates that the device is a caching device, the device is selected and removed from the storage pool. Subsequently, the removed cache device may be added to a storage pool of a storage appliance different from the storage pool from which it was removed (operation 204). Since striped profile typically applies for cache devices, the removal operation is automatically performed by selecting the desired device(s) from the storage pool of a storage appliance and appropriate devices will be automatically removed from the pool. In one embodiment, to add and/or remove devices, an application programming interface call is made from the processing device 102 to one of the file systems 184-188 (of FIG. 2B), which in turn and/or removes the desired device from the storage pool of the storage appliance. In some embodiments, an audit log file of the storage appliance may be updated with an entry that indicates a device has been added or removed from the respective storage pool of the storage appliance.

When the request indicates that the device is a log device, a profile type associated with the log device is identified (operation 206). When the profile of the log device is "striped" as determined in operation 208, the removal operation is done by selecting the desired log device in the user-interface and the system will automatically remove the log device from the pool (operation 210). When the profile of the log device is "mirrored", it is determined whether the mirror of the log device is located in the same chassis (operation 212). When the mirror is in the same chassis, it indicates that the log device was configured in mirror profile with mirror disks in the same chassis. Stated differently, when the desired device and the mirrored device are in the same chassis, it indicates that the devices are in the same JBOD. If the user selects an odd number of devices to remove as determined in operation 214, an error message is displayed in the user-interface corresponding to the storage appliance, as shown in operation 216. If the user selects even number of devices, mirror pairs will be removed. Thus, in operation 218, the log device and the mirror are removed from the storage pool of the storage appliance.

Returning to operation 212 of FIG. 2, when the mirror is located on a different chassis than the log device to be removed, the log devices are configured as mirrored on multiple chassis (with or without no single point of failure (NSPF). This implies the mirror pairs are located on different JBODs so that, in the case where there is a JBOD failure, the data is still available through its mirror pair on another JBOD.

If the user then selects an odd number of devices to be removed in operation 220, an error message will be displayed in the user-interface as illustrated in operation 216. If the user selects an even number of devices, however, a check is done to determine if the existing profile still applies or if NSPF is affected in operation 222. For example, if there are 2 chassis with 2 log devices on chassis #1 and 2 on chassis #2 (NSPF) and the user selects 2 disks to be removed from chassis #2, NSPF is now not supported and the user is notified via the graphical-user interface. If the profile is supported or would still apply after removal of the log device and the mirror, the log device and mirror are removed from the storage pool of the storage appliance in operation 218. Thus, through the operations of the method 200 of FIG. 2, administrative users of the storage appliance may interact with the storage appliance user-interfaces to logically move devices included in a storage pool of the storage appliance to other storage appliance pools when performing a cost/benefit analysis or to move such devices between pools depending upon load circumstances of a given storage appliance.

Figure 3:
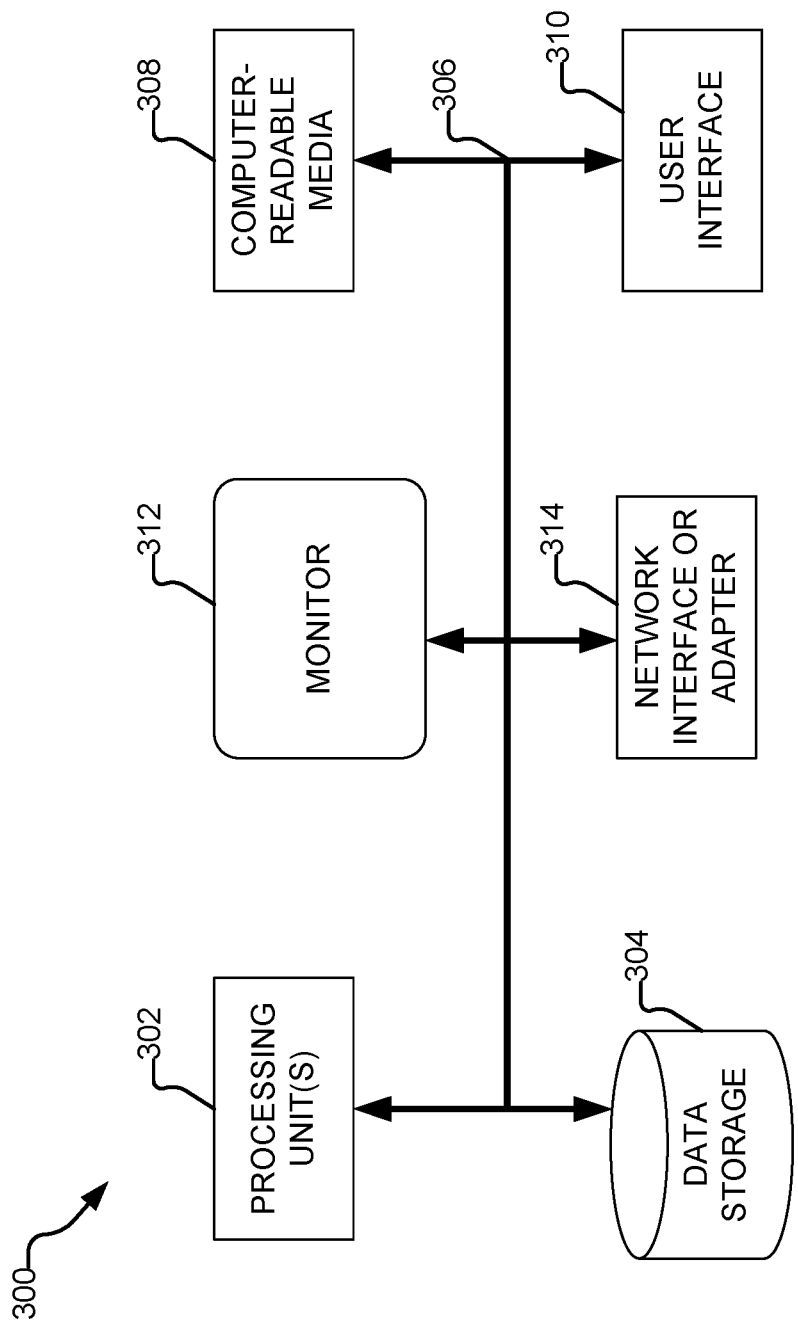
FIG. 3 is a block diagram illustrating a computing device for managing devices of a storage appliances, according to aspects of the present disclosure.

FIG. 3 illustrates an example of a suitable computing and networking environment 300 that may be used to implement various aspects of the present disclosure described in FIGS. 1-2. As illustrated, the computing and networking environment 300 includes a general purpose computing device 300, although it is contemplated that the networking environment 300 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 300 may include various hardware components, such as a processing unit 302, a data storage 304 (e.g., a system memory), and a system bus 306 that couples various system components of the computer 300 to the processing unit 302. The system bus 306 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 300 may further include a variety of computer-readable media 308 that includes removable/non-removable media and volatile/nonvolatile media, but excludes transitory propagated signals. Computer-readable media 308 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 300. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 304 includes computer storage media in the form of volatile/nonvolatile memory such as read only memory (ROM) and random access memory (RAM). A basic input/output system (BIOS), containing the basic routines that help to transfer information between elements within the computer 300 (e.g., during start-up) is typically stored in ROM. RAM typically contains data and/or program modules that are immediately accessible to and/or presently being operated on by processing unit 302. For example, in one embodiment, data storage 304 holds an operating system, application programs, and other program modules and program data.

Data storage 304 may also include other removable/non-removable, volatile/nonvolatile computer storage media. For example, data storage 304 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 3, provide storage of computer-readable instructions, data structures, program modules and other data for the computer 300.

A user may enter commands and information through a user interface 310 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 302 through a user interface 310 that is coupled to the system bus 306, but may be connected by other interface and bus structures, such as a parallel port, game port or a universal serial bus (USB). A monitor 312 or other type of display device is also connected to the system bus 306 via an interface, such as a video interface. The monitor 312 may also be integrated with a touch-screen panel or the like.

The computer 300 may operate in a networked or cloud-computing environment using logical connections of a network interface or adapter 314 to one or more remote devices, such as a remote computer. The remote computer may be a personal computer, a server, a router, a network PC, a peer device or other common network node, and typically includes many or all of the elements described above relative to the computer 300. The logical connections depicted in FIG. 3 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 300 may be connected to a public and/or private network through the network interface or adapter 314. In such embodiments, a modem or other means for establishing communications over the network is connected to the system bus 306 via the network interface or adapter 314 or other appropriate mechanism. A wireless networking component including an interface and antenna may be coupled through a suitable device such as an access point or peer computer to a network. In a networked environment, program modules depicted relative to the computer 300, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system for managing devices in a storage appliance comprising:
   a plurality of physical storage devices logically arranged in a storage pool of a storage appliance, the storage appliance being associated with at least one file system; and
   an application, executing on a processing device, wherein the application communicates with the file system to logically remove devices from the plurality of physical storage devices from the storage pool by:
   receiving a request to remove at least one device of the plurality of physical storage devices through the application;
   determining, based on the request, that the at least one device includes a log device configured to support redundant storage;
   at least partly in response to determining that the at least one device includes the log device configured to support redundant storage, identifying another device further configured to support the redundant storage; and
   removing the log device and the other device from the storage pool of the storage appliance.

2. The system of claim 1, wherein the file system is a ZFS file system.

3. The system of claim 1, wherein a data profile corresponding to the log device includes a mirrored device profile.

4. The system of claim 1, wherein the at least one device includes multiple devices, and wherein identifying the other device includes identifying the other device from amongst the multiple devices.

5. The system of claim 1, wherein identifying the other device includes identifying a different device maintained in a chassis that also supports the log device.

6. The system of claim 1, wherein the application further:
   receives another request to remove at least one second device of the plurality of physical storage devices through the application;
   determines, based on the other request, that the at least one second device includes a cache device; and
   in response to determining that the at least one second device includes the cache device, removes an odd number of devices from the storage pool of the storage appliance, the odd number of devices including the cache device.

7. The system of claim 1, wherein the processing device is further configured to add the at least one device to a different storage pool included in a different storage appliance by:
   establishing an application programming interface call to the file system to initiate addition of the at least one device and the other device to the different storage pool.

8. A method for managing devices in a storage appliance comprising:
   receiving a request to remove at least one device of a plurality of physical storage devices through an application executing on a processing device, wherein the plurality of physical storages devices are arranged in a storage pool of the storage appliance, the storage appliance being associated with at least one file system;
   determining, based on the request, that the at least one device includes a log device configured to support redundant storage;
   at least partly in response to determining that the at least one device includes the log device configured to support redundant storage, identifying another device further configured to support the redundant storage; and
   removing the log device and the other device from the storage pool of the storage appliance.

9. The method of claim 8, wherein the file system is a ZFS file system.

10. The method of claim 8, wherein a data profile corresponding to the log device includes a mirrored device profile.

11. The method of claim 8, wherein the at least one device includes multiple devices, and wherein identifying the other device includes identifying the other device from amongst the multiple devices.

12. The method of claim 8, wherein identifying the other device includes identifying a different device maintained in a chassis that also supports the log device.

13. The method of claim 8, further comprising:
   receiving another request to remove at least one second device of the plurality of physical storage devices through the application;
   determining, based on the other request, that the at least one second device includes a cache device; and
   in response to determining that the at least one second device includes the cache device, removing an odd number of devices from the storage pool of the storage appliance, the odd number of devices including the cache device.

14. The method of claim 8, further comprising:
establishing an application programming interface call to the file system to initiate addition of the at least one device and the other device to a different storage pool.

15. A non-transitory computer readable medium including instructions for managing devices in a storage appliance, the instructions being executable by a processor to cause the processor to perform actions comprising:
receiving a request to remove at least one device of a plurality of physical storage devices through an application executing on a processing device, wherein the plurality of physical storages devices are arranged in a storage pool of a storage appliance, the storage appliance being associated with at least one file system;
determining, based on the request, that the at least one device includes a log device configured to support redundant storage;
at least partly in response to determining that the at least one device includes the log device configured to support redundant storage, identifying another device further configured to support the redundant storage; and
removing the log device and the other device from the storage pool of the storage appliance.

16. The non-transitory computer readable medium of claim 15, wherein the file system is a ZFS file system.

17. The non-transitory computer readable medium of claim 15, wherein a data profile corresponding to the log device includes a mirrored device profile.

18. The non-transitory computer readable medium of claim 15, wherein the at least one device includes multiple devices, and wherein identifying the other device includes identifying the other device from amongst the multiple devices.

19. The non-transitory computer readable medium of claim 15, wherein identifying the other device includes identifying a different device maintained in a chassis that also supports the log device.

20. The non-transitory computer readable medium of claim 15, wherein the actions further include:
receiving another request to remove at least one second device of the plurality of physical storage devices through the application;
determining, based on the other request, that the at least one second device includes a cache device; and
in response to determining that the at least one second device includes the cache device, removing an odd number of devices from the storage pool of the storage appliance, the odd number of devices including the cache device.

* * * * *